United States Patent [19]

Chalfant

[11] 4,015,380
[45] Apr. 5, 1977

[54] TRUCK LOADING DOCK SEAL

[75] Inventor: Thomas W. Chalfant, Westlake, Ohio

[73] Assignee: Chalfant Sewing Fabricators, Inc., Cleveland, Ohio

[22] Filed: Apr. 28, 1976

[21] Appl. No.: 681,075

[52] U.S. Cl. .............................. 52/173 DS; 49/475; 49/495

[51] Int. Cl.$^2$ ......................................... E06B 7/23

[58] Field of Search ......... 52/173 DS; 49/475, 498, 49/495

[56] References Cited

UNITED STATES PATENTS

| | | | |
|---|---|---|---|
| 181,968 | 9/1876 | Osgood | 49/498 |
| 3,181,205 | 5/1965 | Frommelt | 49/475 |
| 3,230,675 | 1/1966 | Frommelt | 52/173 DS |
| 3,286,417 | 11/1966 | Dazzo | 52/173 DS |
| 3,555,734 | 1/1971 | Hirtle | 49/498 |

Primary Examiner—Price C. Faw, Jr.
Assistant Examiner—Henry Raduazo
Attorney, Agent, or Firm—Bosworth, Sessions & McCoy

[57] ABSTRACT

A shelter or seal structure for truck docks whereat the cargo body of a truck or trailer is loaded or unloaded. The doorway in a warehouse or the like, against which the end of the cargo body is backed is provided with an exterior perimetric compressible seal structure engageable with the back end of the cargo body along the top and opposite sides. The seal structure at the sides comprises in each instance an elongated upright compressible block formed, for example, of foam rubber or the like and affixed to the outside wall adjacent the doorway. The block has a base layer of plastic sheet secured to the outer-face and an outer strip of plastic sheet fastened to the base layer at spaced locations along horizontal seams to define bulges between the seams. Upon engagement between the seal structure and the cargo body the bulges collapse accordian-fashion against the base layer and are capable of sliding in a vertical direction to accomodate vertical movement of the cargo body while backed into the dock to its loading and unloading position.

3 Claims, 4 Drawing Figures

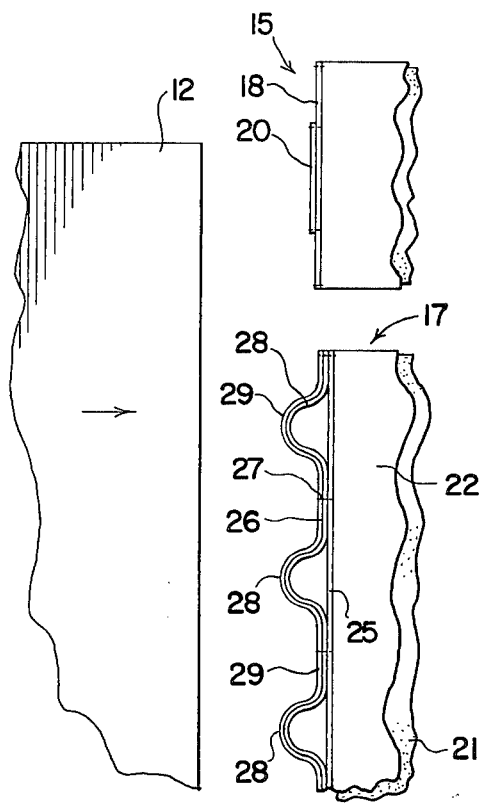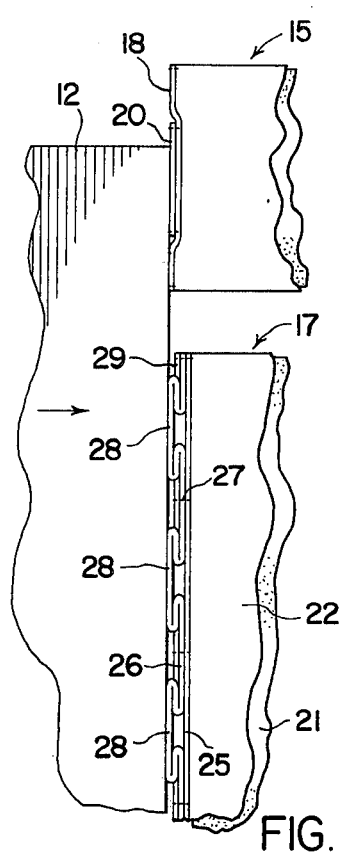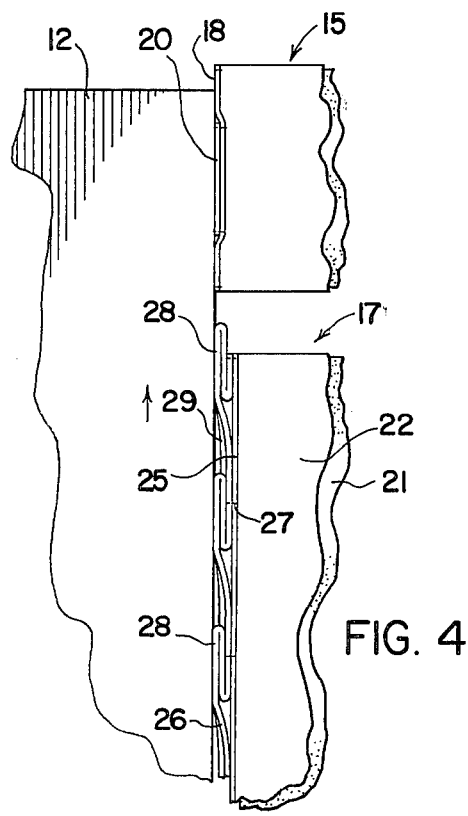

TRUCK LOADING DOCK SEAL

BACKGROUND OF THE INVENTION

This invention relates to shelters or seal structures for loading docks whereat a cargo body of a truck or trailer is backed against a doorway at the dock, and especially to a compressible seal structure surrounding the doorway and engageable with the rear end of the cargo body to provide a shelter or seal against rain and cold during the loading and unloading operations. More particularly, the invention relates to a structure which minimizing abrasion resulting from the vertical movement of the cargo body as the load within it changes. In many circumstances, this vertical movement can be as great as two or three inches.

Loading dock shelters or seal structures are commonly used around warehouse doors etc. to afford shelter for both workers and goods during the loading and unloading of cargo bodies for trucks and trailers. Normally these structures have a perimetric form including side members and a top member extending across the top of the doorway between the two side members. Preferably, the members are resilient so that they compress when the cargo body is backed against the doorway in the warehouse wall. Typical structures of this type are shown in U.S. Pat. Nos. 3,403,489 and 3,699,733.

It is particularly important that the structure engaged by the cargo body is able to stand the wear and abrasion that occurs during vertical movement of the cargo body as a result of differences in load within the cargo body itself. For example, if a cargo body containing an exceptionally heavy load is backed against the seal structure and the entire load initially contained therein is removed it may be expected that the cargo body will raise two or three inches due to the extension of the vehicle springs which were initially compressed to a great degree.

Conversely, when an empty cargo body is backed against the seal structure, a considerable vertical movement in the downward direction occurs when an exceptionally heavy load is placed therein. Here again, a downward movement of two or three inches may be expected. While attempts have been made to accommodate this movement without excessive wear and abrasion, prior art seal structures often cannot hold up under these conditions very long and frequent replacement is required, often long before the other elements of the structure have served a useful life.

The seal structure of the present invention, however, reduces the difficulties indicated above and affords other features and advantages heretofore not obtainable.

SUMMARY OF THE INVENTION

It is among the objects of the invention to accommodate with greater effectiveness, vertical movement occurring during loading and unloading operations between a cargo body of a truck or trailer and a seal structure surrounding a doorway at a truck dock in a warehouse or the like against which the cargo body has been backed.

These and other objects and advantages are achieved by the unique loading dock seal construction of the invention adapted to be attached to an outside wall adjacent a warehouse doorway through which cargo is to be loaded and unloaded into and from a cargo body. The structure includes a horizontal top member and two upright side members secured to the exterior wall adjacent the doorway to form a perimetric pad.

Each of the side members includes an elongated upright compressible block, at least one base layer of flexible plastic sheet material secured to the outer face of the block and a strip of flexible plastic sheet material secured to the base layer at uniformly spaced locations along horizontal seams to form outwardly protruding bulges between the seams. Accordingly, upon engagement by the cargo body and the side members, the bulges collapse accordian-fashion against the base layer and as a result are capable of sliding in a vertical direction as necessary to accommodate vertical movement of the cargo body while in its loading and unloading position.

BRIEF DESCRIPTION OF THE DRAWINGS

FIG. 2 is a fragmentary elevational view illustrating the loading dock seal of the invention just prior to being engaged by a cargo body as in FIG. 1;

FIG. 3 is a fragmentary sequential elevational view similar to FIG. 2 showing the condition of the side member of loading dock seal after engagement by the cargo body;

FIG. 4 is a fragmentary sequential elevational view similar to FIGS. 2 and 3 illustrating the relationship between the side member of the loading dock seal structure of the invention engaged by a cargo body after the cargo has been loaded from the cargo body.

DESCRIPTION OF THE PREFERRED EMBODIMENT

Figure 1:
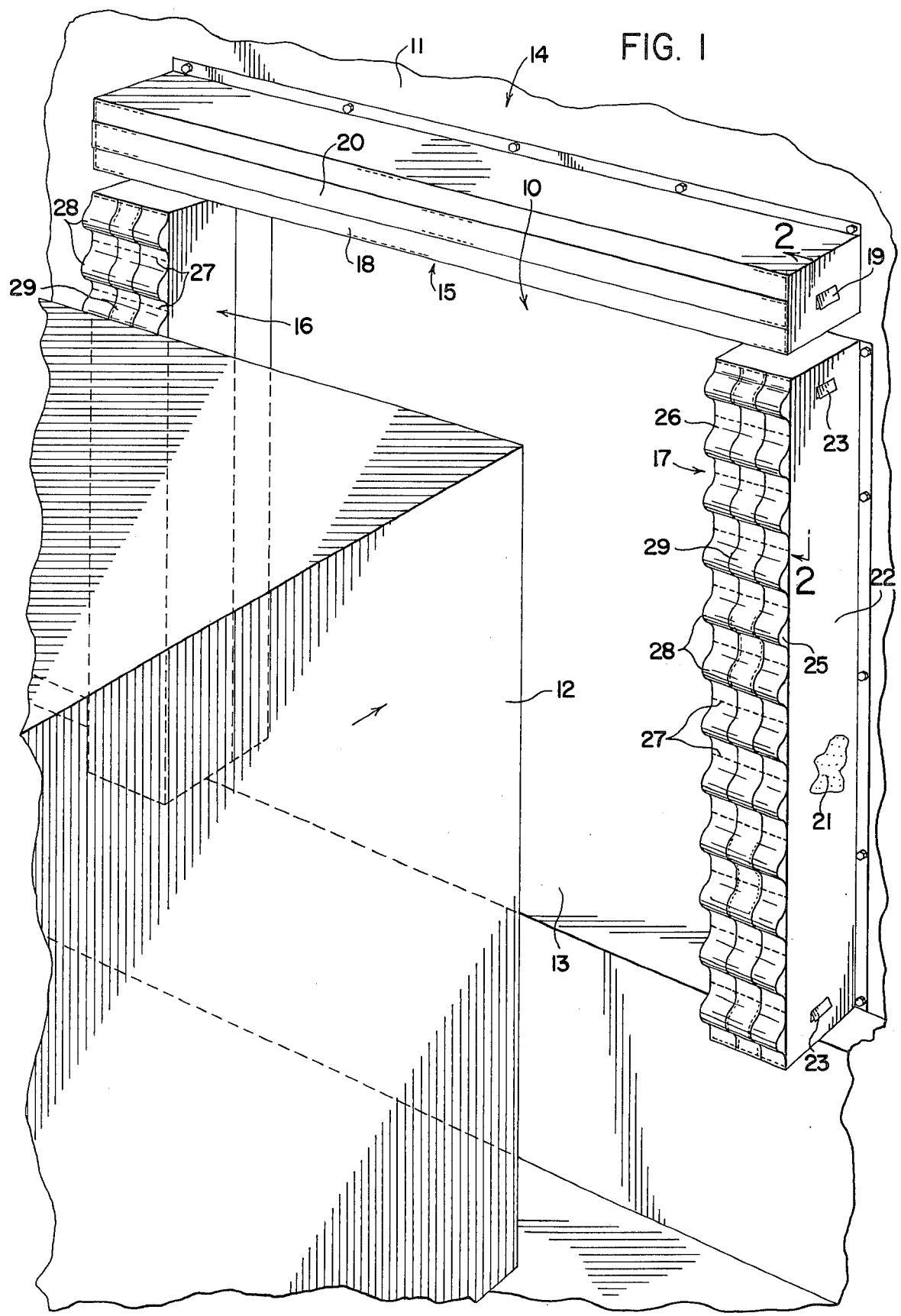
FIG. 1 is a perspective view illustrating a doorway formed in the outside wall of a building at a loading dock and illustrating a cargo body of a truck or trailer being backed into a loading and unloading position at the dock and against a seal structure embodying the invention.

Referring more particularly to the drawings, FIG. 1 shows a doorway 10 in an outside wall of a warehouse 11 or the like at a docking station whereat the cargo body 12 of a truck or trailer is backed into a loading and unloading position. The floor 13 beneath the doorway 10 is located at a level approximately corresponding to the floor of the cargo body 12 to facilitate the loading and unloading of cargo.

In accordance with the invention, a shelter or seal structure 14 is provided around the doorway 10 to cooperate with the rear end of the cargo body 12 and protect the cargo and workers from weather conditions such as rain, snow, wind, and cold. The seal structure includes a top member 15 located over the doorway 10 and two parallel side members 16 and 17 located on the outside wall on opposite sides of the doorway 10. The top member 15 forms no part of the invention and may comprise, for example, an elongated block of compressible material such as foam rubber covered by a layer 18 of flexible plastic sheet material to protect the block and assist in forming a seal. Vents 19 at each end permit escape and entry of air during compression and expansion respectively. A center strip 20 (yellow in color, for example) is provided in the outer face of the top member 15 to serve as a visual guide to the vehicle driver during the backing operation.

Each of the side members 16 and 17 is formed in accordance with the invention and comprises an elongated block 21 of compressible material such as foam rubber and a cover 22 of plastic sheet material such as vinyl sheet to protect the side member against weather, etc. A pair of air vents 23 are provided in the sides of the side members 16 and 17 to permit escape of air when the block is compressed and vice versa.

FIGS. 2 through 4 illustrate sequentially the condition of the side member 17 during an unloading operation. Located on the outer face of the block 21 is a base layer 25 of flexible sheet material such as vinyl plastic. Attached to the base layer 25 is a cover strip 26 which is sewn to the base layer along horizontal seams 27 at spaced locations and in such a way as to form bulges 28 in the cover strip as best illustrated in FIGS. 1 and 2. The cover strip 26 preferably has a center strip 29 of reduced width (formed of yellow material) to provide a visual guide for the vehicle operator during the backing operation.

As illustrated in FIG. 2, the bulges 28 extend outwardly from the block. As the cargo body 12 is backed against the bulges 28, they collapse accordian-fashion until they are in the flattened condition illustrated in FIG. 3. Further backing movement of the cargo body 12 causes compression of the flexible block 21, the compression occuring in both of the side members as well as in the top member 15.

It will be seen that in this condition, a seal is provided between the rear end of the cargo body 12 and the doorway 10 to shelter the cargo and workers during the loading and/or unloading operation. In this instance, the invention is illustrated with respect to the condition that occurs when a substantial load is removed from the cargo body 12. As a result of the drastically reduced weight on the springs of the truck or trailer when the cargo body is unloaded, the cargo body moves vertically in an upward direction relative to the doorway as illustrated in FIG. 4. This movement may be as great as two or three inches.

The relative movement between the cargo body 12 and the seal structure in accordance with the invention, however, does not produce any substantial abrasion or frictional contact between the truck body and the side members 16 and 17. On the contrary, the sides of the rear end of the cargo body 12 continue to engage the same surface area on the collapsed bulges 28 but sliding movement occurs between the folded over surface portions of the plastic material of the cover strip 26 as illustrated in FIGS. 3 and 4.

In this way, wear and abrasion of the seal structure is greatly reduced and effective sealing will be accomplished over a much greater period of time before replacement of the seal structure is necessary.

While the invention has been shown and described with respect to a preferred embodiment thereof, this is intended for the purpose of illustration rather than limitation and other variations and modifications in the specific embodiment herein shown and described will be apparent to those skilled in the art all within the intended spirit and scope of the invention.

Accordingly, the patent is not to be limited in scope and effect to the specific embodiment herein shown and described nor in any other way that is inconsistent with the extent to which the progress in the art has been advanced by the invention.

I claim:

1. In a loading dock seal structure supported along the outside top and sides of a wall adjacent a loading dock doorway, said structure including a top member and two side members to sealingly engage the top and sides of the end of a truck or trailer cargo body backed into loading and unloading position relative to said doorway, each of said side member comprises:
    an elongated upright compressible block,
    at least one layer of flexible material secured to the outer face of said block,
    a strip of flexible material secured to said layer at uniformly spaced locations along horizontal seams to form outwardly extending horizontal bulges between said horizontal seams,
    whereby upon engagement by said cargo body said bulges collapse accordion fashion to a flattened condition against said layer and the interior surfaces of said bulges slide against one another in a vertical direction to accommodate vertical movement of said truck cargo body during loading and unloading in its docked position against said seal.

2. A seal structure as defined in claim 1 wherein said block is formed of resilient foam material.

3. A seal structure as defined in claim 2 wherein said foam is an elastomeric foam.

* * * * *